US012726577B2

(12) United States Patent
Kikuchi

(10) Patent No.: US 12,726,577 B2
(45) Date of Patent: Sep. 1, 2026

(54) IMAGE FORMING APPARATUS, MEDIUM EJECTION METHOD, AND COMPUTER-READABLE STORAGE MEDIUM

(71) Applicant: Toshiba Tec Kabushiki Kaisha, Tokyo (JP)

(72) Inventor: Kazuhiko Kikuchi, Yokohama Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 360 days.

(21) Appl. No.: 18/581,875

(22) Filed: Feb. 20, 2024

(65) Prior Publication Data

US 2025/0008035 A1 Jan. 2, 2025

(30) Foreign Application Priority Data

Jun. 27, 2023 (JP) ................................ 2023-105082

(51) Int. Cl.
*H04N 1/00* (2006.01)
*G03G 15/00* (2006.01)
*G03G 21/16* (2006.01)

(52) U.S. Cl.
CPC ..... *H04N 1/00633* (2013.01); *G03G 15/5062* (2013.01); *G03G 21/1657* (2013.01); *H04N 1/00342* (2013.01); *H04N 2201/0055* (2013.01)

(58) Field of Classification Search
None
See application file for complete search history.

(56) References Cited

U.S. PATENT DOCUMENTS

2006/0226987 A1 10/2006 Nagase
2006/0266818 A1* 11/2006 Oyama .................. B42C 19/06 235/375
2007/0133039 A1 6/2007 Yamada
2009/0195828 A1* 8/2009 Urakawa ........... H04N 1/00233 358/1.15

(Continued)

FOREIGN PATENT DOCUMENTS

EP 4093007 A1 * 11/2022 ......... H04N 1/32138
JP S62-059628 U 4/1987

(Continued)

OTHER PUBLICATIONS

Watanabe et al. JP-2010175860-A English Translation (Year: 2010).*

(Continued)

*Primary Examiner* — Miya J Cato
(74) *Attorney, Agent, or Firm* — Foley & Lardner LLP

(57) ABSTRACT

An image forming apparatus according to an embodiment includes a processor, an image forming unit, a radio communication unit, a receiving unit, and a shielding member. The processor controls supply and ejection of a medium with a radio tag, which is to be housed in a housing unit. The image forming unit forms an image in the supplied medium. The radio communication unit transmits a radio wave for writing information to the radio tag of the supplied medium. The receiving unit receives the ejected medium. The shielding member is formed in a part of the receiving unit and shields radio waves transmitted from the radio communication unit.

17 Claims, 11 Drawing Sheets

(56) References Cited

U.S. PATENT DOCUMENTS

| | | | | |
|---|---|---|---|---|
| 2010/0219253 | A1 | 9/2010 | Katsumata | |
| 2018/0239289 | A1* | 8/2018 | Takada | H04N 1/00612 |
| 2021/0377418 | A1 | 12/2021 | Ishida | |
| 2022/0374620 | A1 | 11/2022 | Kawasaki | |

FOREIGN PATENT DOCUMENTS

| | | | | |
|---|---|---|---|---|
| JP | 2004051240 | A | * | 2/2004 |
| JP | 2007076066 | A | * | 3/2007 |
| JP | 2007-295211 | A | | 11/2007 |
| JP | 2008-070940 | A | | 3/2008 |
| JP | 2009-012945 | A | | 1/2009 |
| JP | 2010175860 | A | * | 8/2010 |
| JP | 2018-134762 | A | | 8/2018 |
| JP | 2022-178472 | A | | 12/2022 |

OTHER PUBLICATIONS

Toyoda JP-2007076066-A English Translation (Year: 2007).*
Nakano JP-2004051240-A English Translation (Year: 2004).*
EP Search Report for EP Appl. Ser. No. 24158276 dated Jul. 30, 2024 (7 pages).
JP Office Action: Notice of Reasons for Refusal for JP Appl. Ser. No. 2023-105082 dated Dec. 16, 2025 (8 pages).

* cited by examiner

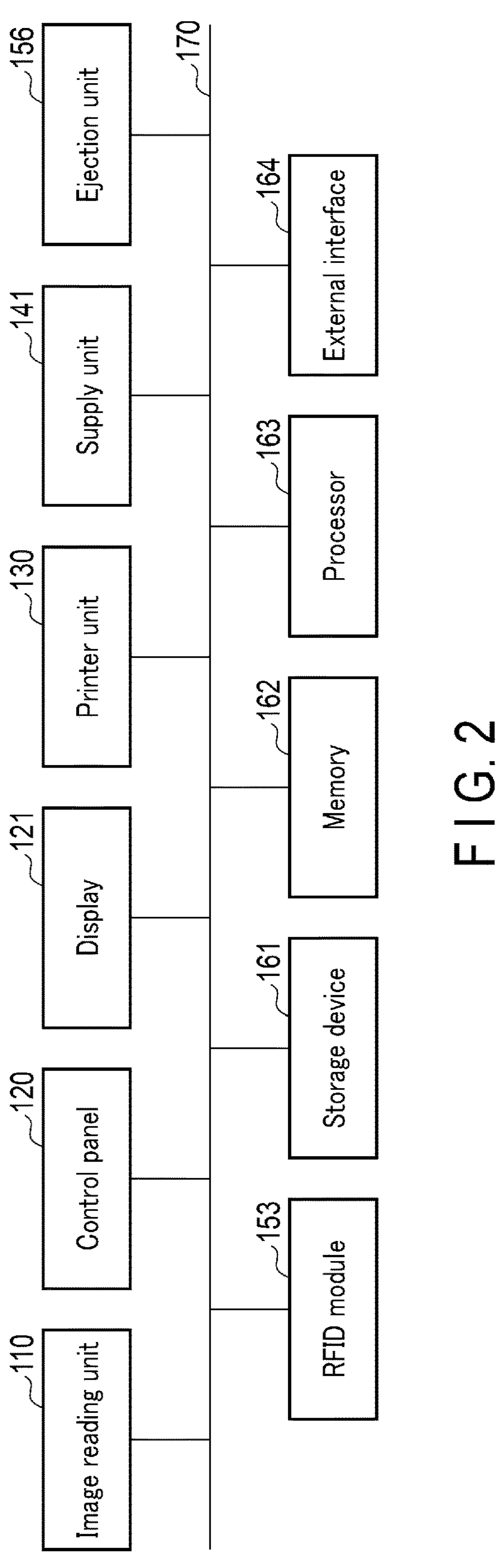
F I G. 2

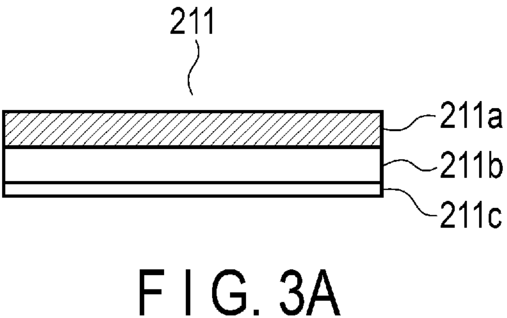
F I G. 3A
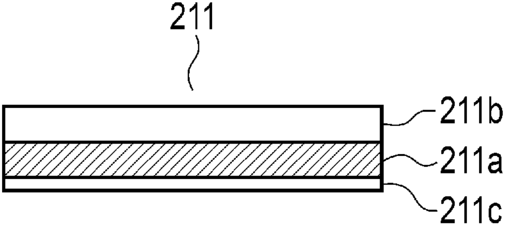
F I G. 3B
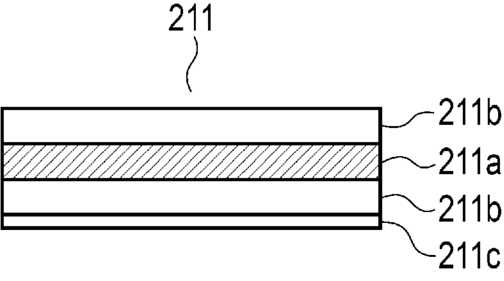
F I G. 3C

| Surface resistance [Ω/□] | Transmission output | |
|---|---|---|
| | 27mW | 58mW |
| 200 | ○ | ○ |
| 250 | ○ | ○ |
| 400 | ○ | ○ |
| 1000 | ○ | ○ |
| $10^4$ | ○ | × |
| $10^5$ | × | × |

FIG. 4

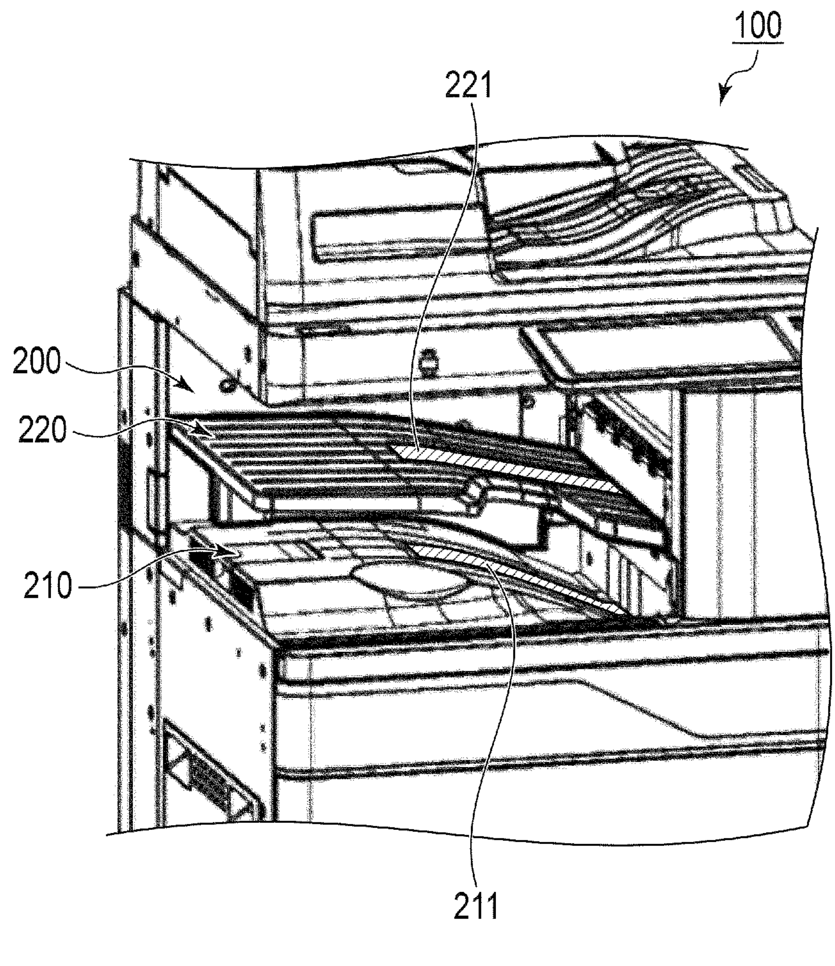
F I G. 7

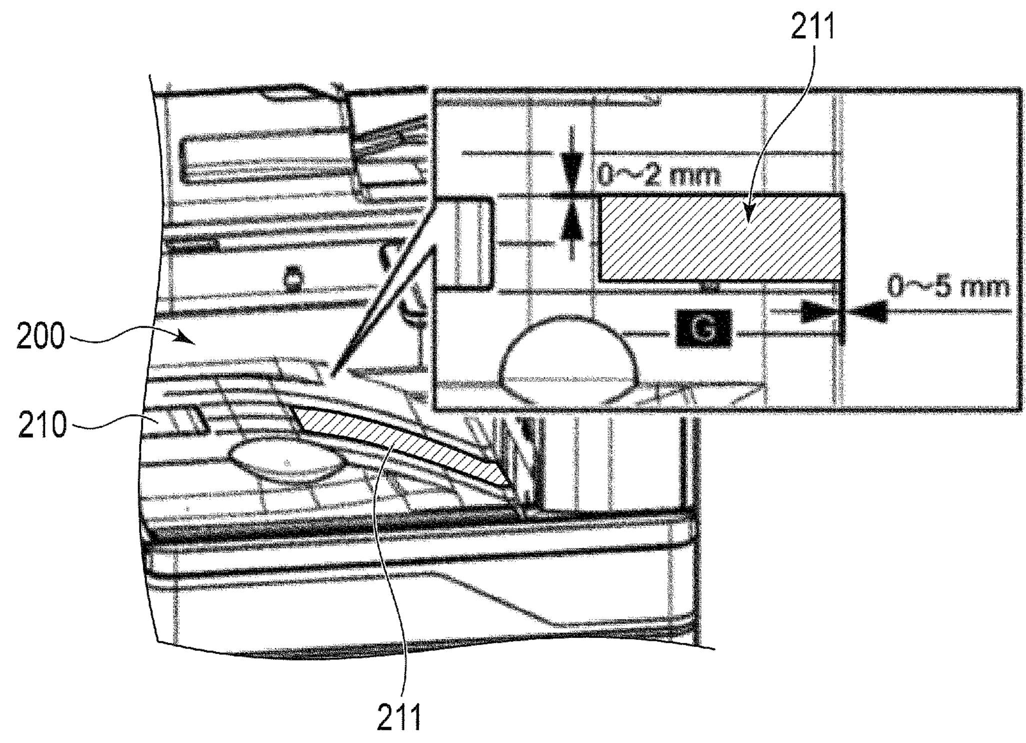
F I G. 8A
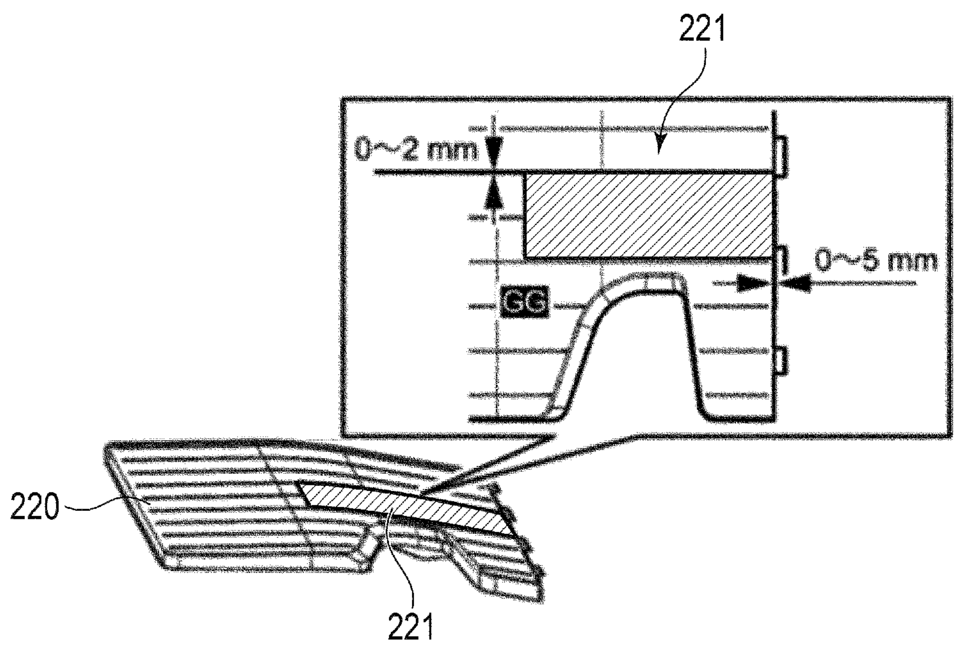
F I G. 8B

IMAGE FORMING APPARATUS, MEDIUM EJECTION METHOD, AND COMPUTER-READABLE STORAGE MEDIUM

CROSS-REFERENCE TO RELATED APPLICATIONS

This application is based upon and claims the benefit of priority from Japanese Patent Application No. 2023-105082, filed Jun. 27, 2023, the entire contents of which are incorporated herein by reference.

FIELD

Embodiments described herein relate generally to an image forming apparatus, a medium ejection method, and a computer-readable storage medium.

BACKGROUND

In recent years, a medium to which a radio tag using a radio frequency identifier (RFID) technique is attached has been used. An image forming apparatus compatible with such a medium is configured to form an image on a medium that is conveyed to the inside of the apparatus body and to write information to a radio tag of the medium at a predetermined timing by emitting radio waves from an antenna.

The image forming apparatus includes a tray configured to receive the medium ejected from the inside of the apparatus body, and the tray receives the medium with the radio tag to which information has been written. For the radio tag of the medium received by the tray, prevention of erroneous writing of information thereto is demanded. For example, a technique of shielding radio waves emitted from an antenna with a conductor has been known. However, adhering of excessive conductor for shielding radio waves not only increases costs but also leads to a risk of deteriorating heat radiation performance.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is a block diagram showing a hardware configuration of the image forming apparatus according to the first embodiment. FIG. 3A is a diagram showing a first example of a laminated structure of a shielding member according to the first embodiment.

FIG. 3B is a diagram showing a second example of the laminated structure of the shielding member according to the first embodiment.

FIG. 3C is a diagram showing a third example of the laminated structure of the shielding member according to the first embodiment.

FIG. 4 is a diagram showing an example of a surface resistance of a conductive layer of the shielding member according to the first embodiment and an erroneous writing preventing effect.

FIG. 7 is a schematic diagram showing an example of a medium receiving unit of an image forming apparatus according to a second embodiment.

FIG. 8A is a diagram showing an example of a shielding member provided in a first tray located in a lower stage of a medium receiving unit according to the second embodiment.

FIG. 8B is a diagram showing an example of a shielding member provided in a second tray located in an upper stage of the medium receiving unit according to the second embodiment.

DETAILED DESCRIPTION

An image forming apparatus according to an embodiment includes a processor, an image forming unit, a radio communication unit, a receiving unit, and a shielding member. The processor controls supply and ejection of a medium which is housed in a housing unit and to which a radio tag is attached. The image forming unit forms an image on the supplied medium. The radio communication unit transmits a radio wave for writing information to the radio tag of the supplied medium. The receiving unit receives the ejected medium. The shielding member is formed in a part of the receiving unit and shields radio waves transmitted from the radio communication unit.

Hereinafter, the image forming apparatus installed in a workplace, etc., will be described.

First Embodiment

Figure 1:
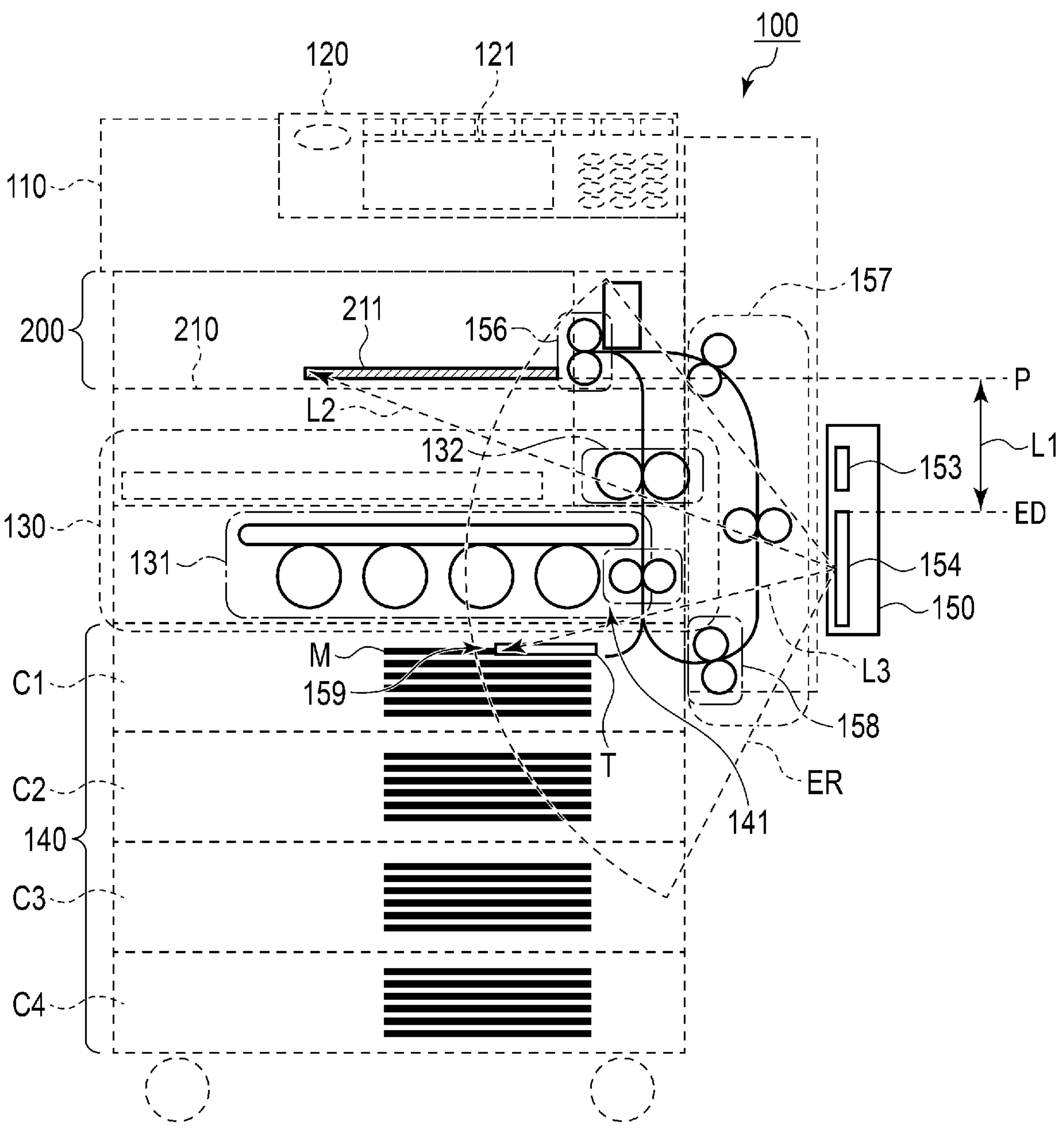
FIG. 1 is a schematic diagram showing an example of an image forming apparatus according to a first embodiment.

FIG. 1 is a schematic diagram showing an example of an image forming apparatus according to a first embodiment.

An image forming apparatus 100 is, for example, a multifunction machine. The image forming apparatus 100 includes an image reading unit 110, a control panel 120, a display 20, a printer unit 130, a medium housing unit 140, an RFID processing unit 150, and a medium receiving unit 200.

For example, the image forming apparatus 100 forms an image using a developer such as toner on a sheet-shaped medium M. The medium M is paper or a label sheet. Furthermore, the medium M corresponds to paper or a label sheet with a radio tag T attached thereto. The medium M may be in any form that allows an image to be formed on its surface. The medium M with the radio tag T attached thereto may indicate that the radio tag T is affixed to the surface of the medium M or that the radio tag T is embedded in the inside of the medium M. The radio tag T according to each embodiment is a tag using a radio frequency identifier (RFID) technique and is also called an “RFID tag”.

The display 121 is an image display device such as a liquid crystal display or an organic electro luminescence (EL) display. The display 121 displays thereon various types of information relating to the image forming apparatus 100.

The control panel 120 has a plurality of buttons. The control panel 120 accepts a user's operations. The control panel 120 outputs a signal corresponding to the operation performed by the user to the processor of the image forming apparatus 100. The control panel 120 and the display 121 may be integrally configured as an integral touch panel.

The printer unit 130 forms an image on the supplied medium M based on image information generated by the image reading unit 110 or image information received via a communication path. For example, the printer unit 130 forms an image through processing described below. The printer unit 130 forms an electrostatic latent image on a photosensitive drum based on image information. The printer unit 130 forms a visible image by attaching a developer to the electrostatic latent image. A specific example of the developer is toner. The printer unit 130 transfers the visible image onto the medium M. The printer unit 130 fixes the visible image on the medium M by heating and pressurizing the medium M.

The medium M on which an image is formed may be a medium M housed in the medium housing unit 140 or a medium M manually inserted. The medium M having an image formed thereon is ejected to the medium receiving unit 200.

The medium housing unit 140 houses therein the media M to be used for image formation in the printer unit 130. For example, the medium housing unit 140 is provided with cassettes C1, C2, C3, and C4. For example, the medium M with the radio tag T attached thereto is housed in the cassette C1.

The image reading unit 110 reads image information relating to a reading object as a light tone. The image reading unit 110 records the read image information. The recorded image information may be transmitted to another image processing device via a network. The recorded image information may be image-formed on the medium M by the printer unit 130.

Next, the inside of the image forming apparatus 100 will be described in detail.

The image forming apparatus 100 includes the supply unit 141, an ejection unit 156, and an inversion path 157. The inversion path 157 includes a resist unit 158.

The printer unit 130 includes an image forming unit 131 and a fixing unit 132. The image forming unit 131 has one or more types of toner. For example, the image forming unit 131 has a yellow toner, a cyan toner, a magenta toner, and a black toner from the upstream side (left side of the drawing). Furthermore, a predetermined toner may be a special toner such as a decolorizing toner. The image forming unit 131 includes a developer, a photosensitive drum, and a charging unit for each toner.

The charging unit uniformly charges the surface (photosensitive layer) of the photosensitive drum. The photosensitive drum is irradiated with laser light, thereby carrying an electrostatic latent image on its surface. The developer adds toner to the electrostatic latent image, thereby developing a visible image from the electrostatic latent image.

Furthermore, the image forming unit 131 has a transfer belt. The images developed by the respective toners are sequentially overlapped on the transfer belt. The images transferred in an overlapped manner are subsequently transferred to the medium M by a transfer roller.

The present embodiment described the printer unit 130 adopting an image formation method using an intermediate transfer system, as described above. However, a direct transfer system, for example, or another transfer system may be used.

The fixing unit 132 includes a heating roller and a pressurizing roller. The heating roller applies heat to the medium M from one surface side of the medium M. The pressurizing roller applies pressure to the medium M from the other surface side of the medium M. The fixing unit 132 fixes toner transferred to the medium M, by applying heat and pressure to the medium M.

The supply unit 141 supplies the medium M housed in the medium housing unit 140. The supply unit 141 is composed of, for example, the supply roller.

The ejection unit 156 ejects the medium M conveyed through the inside of the image forming apparatus 100. The ejection unit 156 is composed of an ejection roller.

The inversion path 157 is a path for inverting the front and back of the medium M, and is utilized in a case in which images are formed on both sides of the medium M. The inversion path 157 is a path in which the medium M conveyed to the ejection unit 156 is inverted by a switchback and is then conveyed.

The resist unit 158 is provided in the inversion path 157. The first embodiment assumes that the resist unit 158 is a resist roller provided at the most downstream part of the inversion path 157. The resist unit 158 temporarily suspends the conveyance of the medium M. By suspending the conveyance of the medium M, the resist unit 158 modifies the inclination of the medium M in a such a manner that the medium M becomes perpendicular to the conveyance direction. Note that the location of the resist unit 158 is not limited to the most downstream part of the inversion path 157. The resist unit 158 may be in any location as long as it is a resist roller provided in a path between the ejection unit 156 and the inversion path 157.

The RFID processing unit 150 is a radio communication unit and is provided outside the inversion path 157. The RFID processing unit 150 includes a controller called a RFID module 153, an antenna substrate 154, and an interface unit. An antenna formed on the antenna substrate 154 is configured to write information to the radio tag T attached to the medium M using radio waves transmitted from the antenna in a condition in which the medium M loaded on the medium housing unit 140 of the image forming apparatus 100 is conveyed to the resist unit 158 and is temporarily suspended.

The medium receiving unit 200 receives the medium M ejected from the ejection unit 156. The medium receiving unit 200 includes a first tray 210, and the first tray 210 includes a shielding member 211. The shielding member 211 is a member provided in a part of the medium receiving unit 200 and having conductivity that shields radio waves transmitted from the antenna formed on the antenna substrate 154. The shielding member 211 prevents erroneous writing to the radio tag T attached to the medium M loaded on the medium receiving unit 200.

For example, the shielding member 211 is formed into a sheet shape and is provided in a part of the first tray 210 serving as the bottom surface of the medium receiving unit 200. The shielding member 211 is adhered along, e.g., ribs of the first tray 210. Furthermore, the antenna substrate 154 is provided below a plane P including the shielding member 211. That is, the shortest distance L1 from the plane P to an upper end ED of the antenna provided on the antenna substrate 154 has a predetermined length (>0).

A partial region of the medium receiving unit 200 is included in a writable region ER that is determined according to the intensity of the radio waves transmitted from the antenna provided on the antenna substrate 154. That is, a partial region of the shielding member 211, which is close to the ejection unit 156, is included in the writable region ER. The shielding member 211 shields radio waves that reach a part of the medium receiving unit 200. On the other hand, the region of the radio tag T of the medium M that is housed in the cassette C1 of the medium housing unit 140 is also included in the writable area ER.

A distance L2 from the antenna provided on the antenna substrate 154 to a partial region far from the ejection unit 156 of the shielding member 211 is longer than a distance L3 from the antenna provided on the antenna substrate 154 to the radio tag T of the medium M that is housed in the cassette C1. As described above, by the shielding member 211 extending from the inside to the outside of the writable region ER and continuously covering the writable region ER from its inside to its outside, erroneous writing to the radio tag T attached to the medium M loaded on the medium receiving unit is certainly prevented.

Furthermore, by the shielding member 211 covering not entirely but partially the medium receiving unit 200, cost reduction can also be achieved without hindering heat radiation performance.

The medium receiving unit 200 includes a receiving surface on which the medium M falls onto. The receiving surface includes an overlapping region which is overlapping with the shielding member 211 in a vertical direction and a non-overlapping region which is not overlapping with the shielding member 211 in a vertical direction.

The overlapping region overlaps in the vertical direction with the radio tag T attached on the medium M ejected onto the receiving surface. The non-overlapping region overlaps in the vertical direction with a region of the medium M other than a region where the radio tag T is attached.

The radio tag T includes an integrated circuit chip. The overlapping region overlaps in the vertical direction with the integrated circuit chip in the radio tag T attached on the medium M ejected onto the receiving surface. The non-overlapping region overlaps in the vertical direction with a region of the medium M other than a region where the integrated circuit chip.

The shielding member 211 is attached onto the receiving surface of the medium receiving unit 200.

The shielding member 211 is closer to one side of the medium receiving unit 200 where the ejected medium M comes from than another side of the medium receiving unit 200 which is an opposite side of the one side in a direction where the ejected medium M proceeds.

The shielding member 211 is formed longer in a direction where the ejected medium M proceeds than in a direction perpendicular to the direction where the ejected medium M proceeds.

The medium receiving unit 200 includes a rib. The shielding member 211 is formed longer along the rib.

Radio wave transmitted from The RFID processing unit 150 reaches the shielding member 211.

The RFID processing unit 150 and the shielding member 211 are in a distance where The RFID processing unit 150 can write information to the radio tag T of the ejected medium M on the medium receiving unit 200 if the medium receiving unit 200 does not have the shielding member 211.

The medium receiving unit 200 includes a rib, and the shielding member 211 is attached to the receiving unit 200 along the rib.

FIG. 2 is a block diagram showing a hardware configuration of the image forming apparatus according to the first embodiment.

The image forming apparatus 100 includes the image reading unit 110, the control panel 120, the display 121, the printer unit 130, the supply unit 141, the ejection unit 156, the RFID module 153, a storage device 161, a memory 162, a processor 163, and an external interface 164.

The supply unit 141 is a mechanism for feeding the media M loaded on the medium housing unit 140 and a manual feed tray to the printer unit 130. Hereinafter, the RFID module 153, the storage device 161, the memory 162, the processor 163, and the external interface 164 will be described. The functional units are connected to each other via a system bus 170 in a communicable manner.

The storage device 161 is, for example, a hard disk or a solid state drive (SSD), and stores various types of data. The various types of data correspond to a printing job accepted from an external communication device and a software program for controlling operations of respective functional units of the image forming apparatus 100. The printing job may be a job relating to double-sided printing, or a job relating to printing of multiple sheets. The printing job may include image information relating to an image printed on the medium M.

The memory 162 temporarily stores data for use by each of the functional units included in the image forming apparatus 100. The memory 162 is, for example, a random access memory (RAM). The memory 162 may store digital data generated by the image reading unit 110. The memory 162 may temporarily store a printing job corresponding to printing being performed by the printer unit 130 or writing information to be written to the radio tag.

The processor 163 controls operations of respective functional units of the image forming apparatus 100. The processor 163 loads a software program stored in the storage device 161 on the memory 162 and executes the software program, thereby executing processing. Herein, an example of specific processing of the processor 163 will be described.

Based on a printing job accepted via an external communication device or the control panel 120, the processor 163 controls printing on the medium M to which the radio tag is attached. Upon the acceptance of the printing job relating to the medium M with the radio tag attached thereto, the processor 163 acquires writing information designated by the printing job and image information correlated with the writing information from a writing information server. The image information correlated with the writing information is information relating to an image formed on the medium M. The image information is not necessarily correlated with the writing information. In such a case, the image information may be included in the printing job.

The processor 163 controls the supply unit 141 to supply the medium M. The supply unit 141 supplies the medium M to each unit under the control of the processor 163. Furthermore, the processor 163 controls the ejection unit 156 to eject the medium M. The ejection unit 156 ejects the medium M to the medium receiving unit 200 under the control of the processor 163.

The processor 163 controls the printer unit 130. The printer unit 130 forms an image indicated by the image information on the medium M. The medium M having an image formed thereon is ejected to the medium receiving unit 200.

The processor 163 controls the RFID module 153. The RFID module 153 includes an arithmetic device and a storage device. The RFID module 153 writes information to the radio tag attached to the medium M. Furthermore, the RFID module 153 reads information from the radio tag attached to the medium M. Information that the RFID module 153 reads from a radio tag is, for example, identification information (such as a unique identifier (UID)) for uniquely identifying the radio tag.

The external interface 164 transmits and receives data to and from another device. Herein, another device indicates an information processing device such as a personal computer, a tablet computer, or a smart device. The external interface 164 operates as an input interface and receives data or a command transmitted from another device. The command transmitted from another device is a printing job, etc. The data transmitted from another device is writing information, image information correlated with the writing information, etc. The external interface 164 operates as an output interface and transmits data to another device.

FIG. 3A is a diagram showing the first example of a laminated structure of the shielding member according to the first embodiment.

As shown in FIG. 3A, the shielding member 211 includes a conductive layer 211*a*, a base layer 211*b*, and an adhesive layer 211*c* in this order from the surface that comes into contact with the medium M to be ejected.

FIG. 3B is a diagram showing the second example of the laminated structure of the shielding member according to the first embodiment.

As shown in FIG. 3A, the shielding member 211 includes the base layer 211*b*, the conductive layer 211*a*, and the adhesive layer 211*c* in this order from the surface that comes into contact with the medium M to be ejected.

FIG. 3B is a diagram showing the third example of the laminated structure of the shielding member according to the first embodiment.

As shown in FIG. 3A, the shielding member 211 includes the base layer 211*b*, the conductive layer 211*a*, the base layer 211*b*, and the adhesive layer 21*c* in this order from the surface that comes into contact with the medium M to be ejected.

FIG. 4 is a diagram showing an example of a surface resistance of the conductive layer of the shielding member according to the first embodiment and an erroneous writing preventing effect.

The surface resistance of the conductive layer 211*a* of the shielding member 211 shown in FIG. 3A to FIG. 3B falls within a predetermined range. With the surface resistance [Ω/□] (ohms per square) of the conductive layer 211*a* being equal to or smaller than 1000, erroneous writing can be prevented. For example, the surface resistance [Ω/□] of the conductive layer 211*a* may be set to equal to or smaller than 500.

Because of the surface resistance and the affixing location of the shielding member 211, erroneous writing can be certainly prevented. A relationship between a resistance value and a transmission output shows that, even with a low transmission output, a probability that erroneous writing will occur increases as a resistance value becomes larger.

Figure 5A:
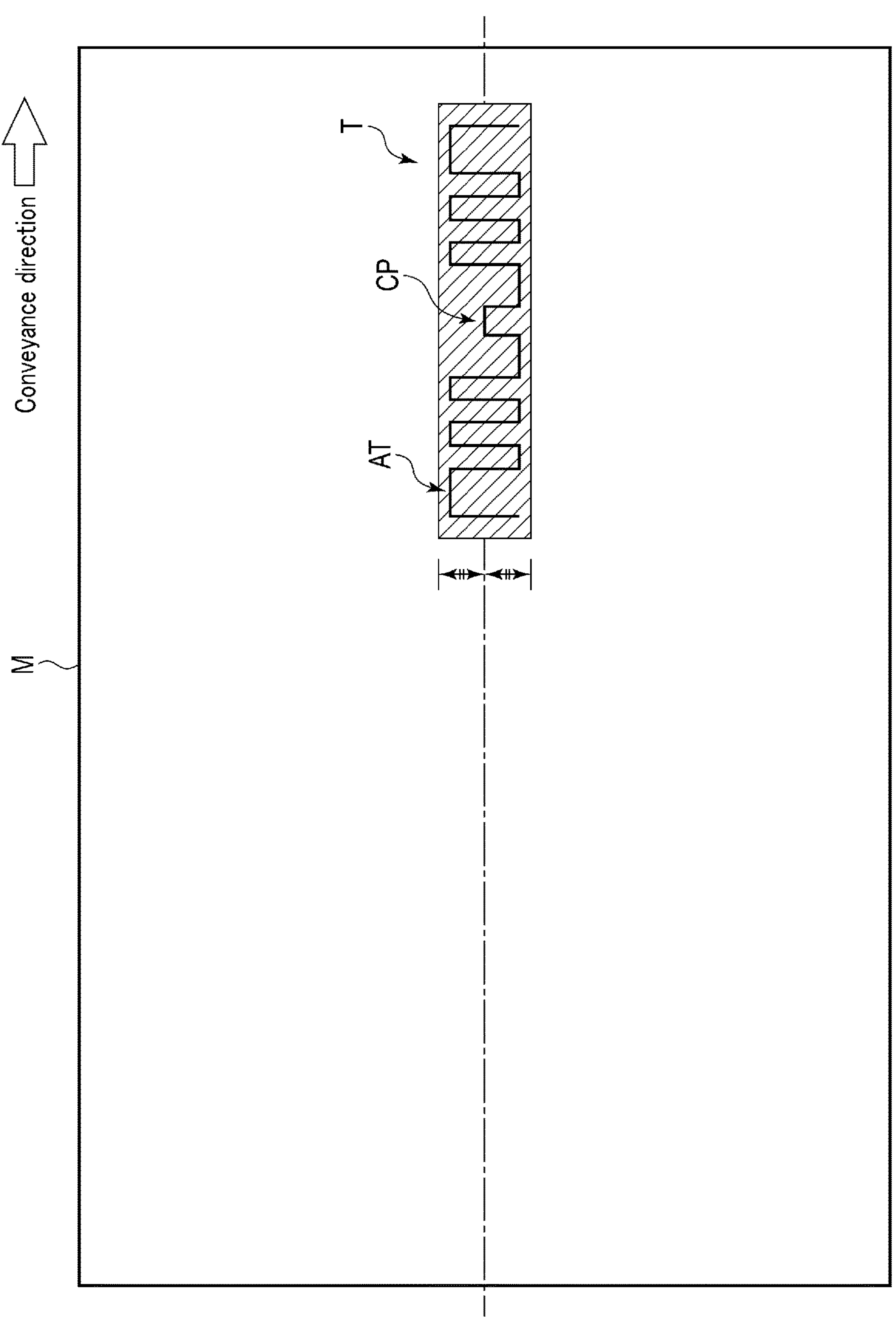
FIG. 5A is a diagram showing a first example of a medium to be processed by the image forming apparatus according to the first embodiment.
Figure 5B:
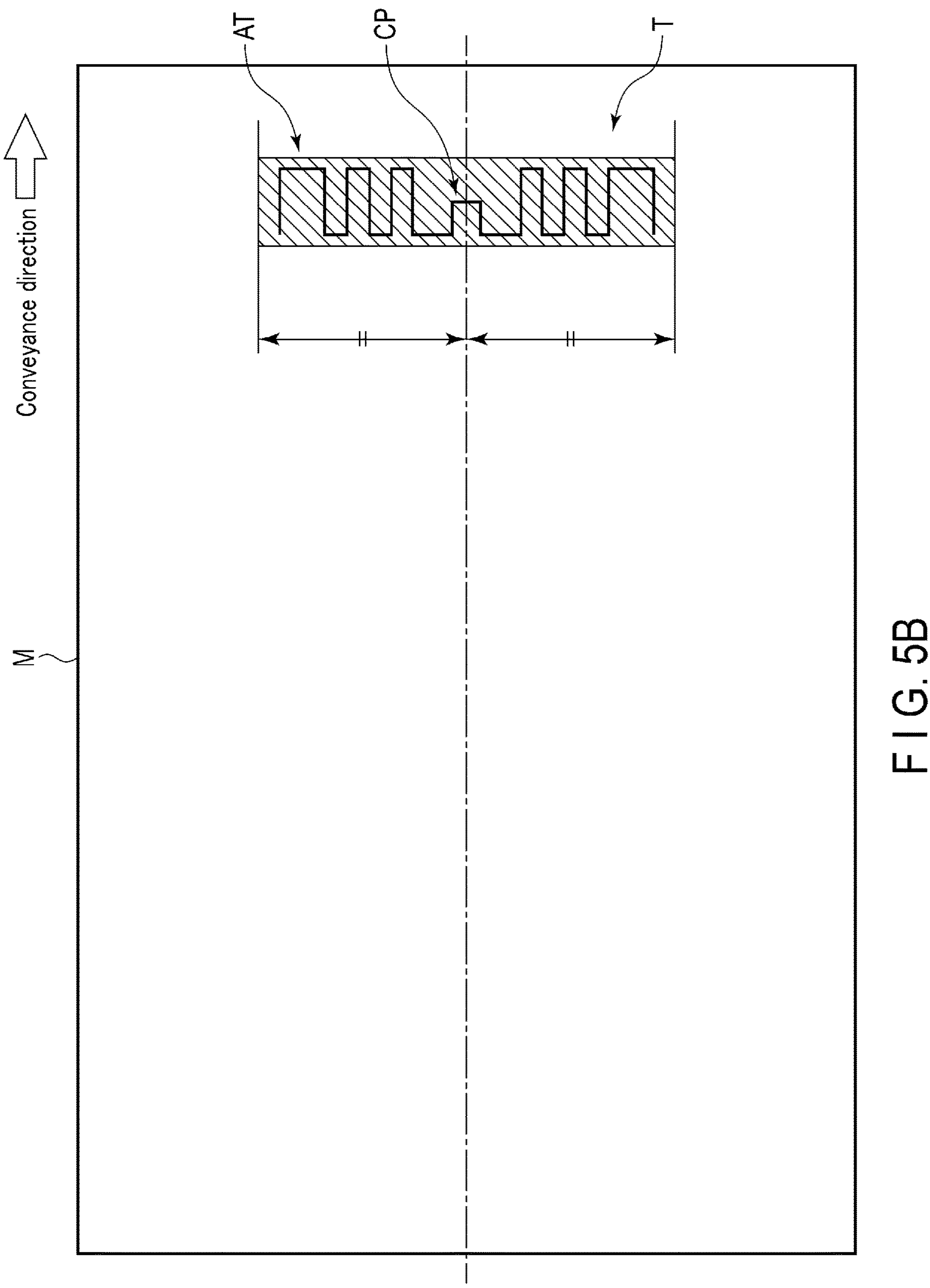
FIG. 5B is a diagram showing a second example of a medium to be processed by the image forming apparatus according to the first embodiment.

FIG. 5A is a diagram showing the first example of the medium to be processed by the image forming apparatus according to the first embodiment. FIG. 5B is a diagram showing the second example of the medium to be processed by the image forming apparatus according to the first embodiment.

As shown in FIG. 5A and FIG. 5B, the radio tag attached to the medium M is an integrated circuit (IC) chip CP and an antenna AT. Tag information is written to or read from the IC chip CP. The antenna AT is connected to the IC chip CP, receives tag information written to the IC chip CP, and transmits tag information read from the IC chip CP.

As shown in FIG. 5A, the conveyance direction of the medium M corresponds to the longitudinal direction of the radio tag T. In the image forming apparatus 100 configured to process such a medium M described above, the ejection direction (conveyance direction) of the medium M corresponds to the longitudinal direction of the shielding member 211 of the first tray 210. That is, the longitudinal direction of the radio tags T of the media M loaded on the first tray 210 corresponds to the longitudinal direction of the shielding member 211 of the first tray 210. By this, the effective shielding effects by the shielding member 211 attached to a part of the first tray 210 can be attained.

Furthermore, as shown in FIG. 5B, the direction orthogonal to the conveyance direction of the medium M corresponds to the longitudinal direction of the radio tag T. In the image forming apparatus 100 configured to process such a medium M described above, the direction orthogonal to the ejection direction (conveyance direction) of the medium M corresponds to the longitudinal direction of the shielding member 211 of the first tray 210. That is, the longitudinal direction of the wireless tags T of the media M loaded on the first tray 210 corresponds to the longitudinal direction of the shielding member 211 of the first tray 210. By this, the effective shielding effects by the shielding member 211 attached to a part of the first tray 210 can be attained.

Figure 6:
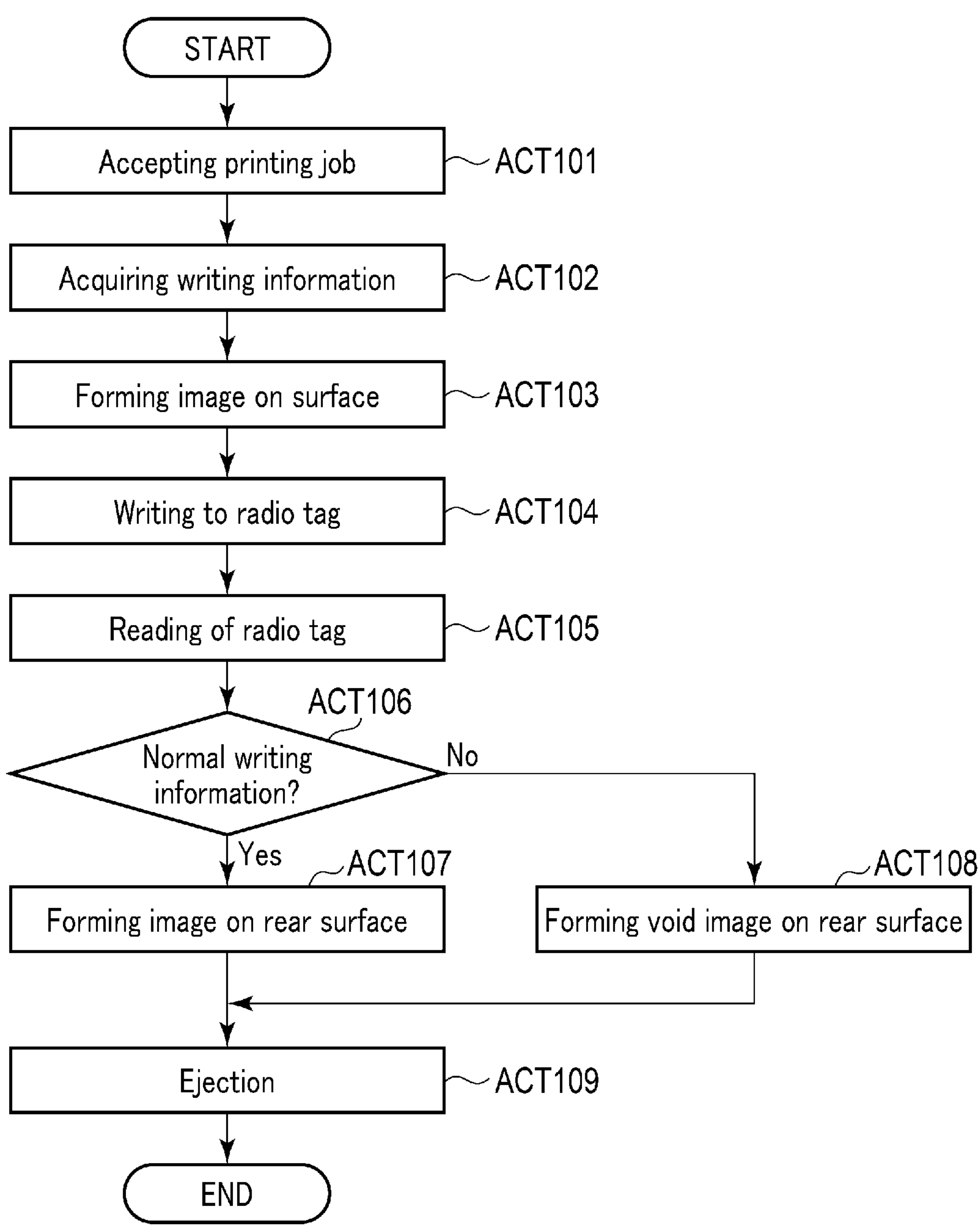
FIG. 6 is a flowchart showing an example of processing a medium by the image forming apparatus according to the first embodiment.

FIG. 6 is a flowchart showing an example of processing a medium by the image forming apparatus according to the first embodiment.

The processor 163 of the image forming apparatus 100 accepts the printing job (ACT101).

For example, an external information processing apparatus such as a personal computer transmits a printing job relating to double-sided printing to the image forming apparatus 100 via a network. The external interface 164 of the image forming apparatus 100 receives the printing job, and the processor 163 accepts the received printing job.

The processor 163 acquires writing information and image information correlated with the writing information (ACT102).

For example, upon the acceptance of the printing job, the processor 163 makes a request to a writing information server for writing information and image information correlated with the writing information via the external interface 164 for. The writing information server transmits the requested writing information and image information correlated with the writing information. The external interface 164 receives writing information and image information correlated with the writing information, and the processor 163 acquires writing information and image information correlated with the writing information.

The printer unit 130 forms an image based on image information on one of the surfaces (front surface) of the conveyed medium M (ACT103).

For example, in response to acceptance of a printing job, the processor 163 requests the supply unit 141 to supply a medium. Based on the request for supply of a medium from the processor 163, the supply unit 141 supplies the medium M housed in the medium housing unit 140. The printer unit 130 develops an image based on the acquired image information and fixes the developed image on the supplied medium M.

The antenna substrate 154 writes writing information to the radio tag T (ACT104).

For example, upon the conveyance of the medium M having an image formed thereon, the antenna substrate 154 transmits electromagnetic waves for writing of writing information. In response to electromagnetic waves being received by the radio tag T attached to the medium M, writing information is written to a storage region of the radio tag T.

The antenna substrate 154 reads out information written to the radio tag T (ACT105).

For example, the antenna substrate 154 transmits electromagnetic waves for reading of the information written to the radio tag T. In response to electromagnetic waves being received by the radio tag T attached to the medium M, the information written to the storage region of the radio tag T is transmitted to the antenna substrate 154. The antenna substrate 154 outputs, as readout information, information received from the radio tag T to the processor 163.

The processor 163 determines whether or not information written to the radio tag T is normal information (ACT106).

For example, the processor 163 determines whether or not readout information satisfies a predetermined condition (condition for writing) relating to the correctness of information. For example, in a case where writing information acquired from the writing information server matches readout information read out from the radio tag T, the processor 163 makes a determination that the information written to the radio tag T is normal information and satisfies the predetermined condition. In a case where writing information acquired from the writing information server does not match readout information read out from the radio tag T, the processor 163 makes a determination that the information written to the radio tag T is not normal information, and does not satisfy the predetermined condition.

In a case where information written to the radio tag T is normal information (ACT106, YES), the printer unit 130 forms an image on the rear surface of the medium M based on image information acquired from the writing information server (ACT107).

For example, the processor 163 exerts control in such a manner that an image based on image information acquired depending on the printing job received by the image forming apparatus 100 is formed on one of the surfaces of the medium M, which is not the surface on which the image was formed in ACT103. The printer unit 130 forms an image on the rear surface of the medium M.

In a case where information written to the radio tag T is not normal information (ACT106, NO), the printer unit 130 forms a void image on the rear surface of the medium M (ACT108).

For example, the processor 163 controls the printer unit 130 in such a manner as to remove a developer to be image-formed on the rear surface of the medium M from a developer carrier. The processor 163 controls the printer unit 130 in such a manner that a void image or blank page is formed. The printer unit 130 forms a void image on the rear surface of the medium M.

The ejection unit 156 ejects the medium M to the first tray 210 of the medium receiving unit (ACT109). The radio tag T of the ejected medium M is loaded in such a manner as to face the shielding member 211 provided in the first tray 210. The radio tag T of the loaded medium M is encompassed by a region perpendicularly above the shielding member 211.

Processing in a case in which information written to the radio tag T is not normal will be additionally described.

The antenna substrate 154 reads out information written to the radio tag T attached to the conveyed medium M. Reading may be performed at a timing immediately after the medium M is temporarily suspended at the resist unit 158 and information is written to the radio tag or at a timing after information is written to the radio tag T and conveyance of the medium M is restarted.

The printer unit 130 forms on the medium M at least one of the image designated by the received printing job and the image indicating that information written to the radio tag T is not normal.

In a case where information read out from the radio tag T satisfies a predetermined condition relating to the correctness of information, the processor 163 controls the printer unit 130 in such a manner that an image designated by the printing job is formed on the medium M or a subsequent medium M that is conveyed subsequent to the medium M.

In a case where information read out from the radio tag T does not satisfy a predetermined condition relating to the correctness of information, the processor 163 controls, according to the printing job, the printer unit 130 in such a manner that a developer carried on a photosensitive drum is removed therefrom. Next, the processor 163 controls the printer unit in such a manner as to form on the medium M an image indicating that information written to the radio tag T is not normal. As described above, in a case where writing to the radio tag T fails, the image forming apparatus 100 prints a void image or a white image on the medium M. This enables the image forming apparatus 100 to continuously process the plurality of media M.

According to the first embodiment, the shielding member 211 is provided in a part of the first tray 210 serving as the bottom surface of the medium receiving unit 200. This can provide an image forming apparatus that suppresses disadvantages of deterioration in heat radiation performance while being superior in preventing erroneous writing.

Second Embodiment

FIG. 7 is a schematic diagram showing an example of a medium receiving unit of an image forming apparatus according to a second embodiment. The configuration other than the medium receiving unit 200 is as presented in FIG. 1 and FIG. 2.

The medium receiving unit 200 includes a plurality of trays. For example, the medium receiving unit 200 includes the first tray 210 located in a lower stage and the second tray located in an upper stage. The first tray 210 includes the shielding member 211. The second tray 220 includes the shielding member 221.

Furthermore, a distance from the antenna substrate 154 of the RFID processing unit 150 to the first tray 210 is shorter than a distance from the antenna substrate 154 of the RFID processing unit to the second tray 220. The configuration of the shielding members 211 and 221 is as presented in FIG. 3A to FIG. 3C and FIG. 4. Furthermore, the configuration of the medium M processed by the image forming apparatus 100 according to the second embodiment is as presented in FIG. 5A or FIG. 5B.

The shielding member 211 is a member provided in a part of the first tray 210 and having conductivity that shields radio waves transmitted from the antenna formed on the antenna substrate 154. The shielding member 211 prevents erroneous writing to the radio tag T attached to the medium M loaded on the first tray 210.

The shielding member 221 is a member provided in a part of the second tray 220 and having conductivity that shields radio waves transmitted from the antenna formed on the antenna substrate 154. The shielding member 221 prevents erroneous writing to the radio tag T attached to the medium M loaded on the second tray 220.

The first embodiment described the relationship between the shielding member 211 and the writable area ER, and the relationship between the distance from the antenna to the shielding member 211 and the distance from the antenna to the radio tag T of the medium M housed in the cassette C1. In the second embodiment, both the shielding member 211 and the shielding member 221 satisfy those relationships.

In the second embodiment, the ejection unit 156 shown in FIG. 1 includes a flap. The flap switches an ejection destination of the medium M based on a signal from the processor 163. That is, the flap switches the ejection destination of the medium M to the first tray 210 or the second tray 220, and ejects the medium M to the first tray 210 or the second tray 220. For example, the processor 163 ejects the medium M that satisfies a condition for writing of information to the radio tag T to the first tray 210, and ejects the medium M that does not satisfy the condition for writing to the second tray 220.

In a case where writing information acquired from the writing information server matches with readout information read out from the radio tag T, the processor 163 detects that the information has been correctly written to the radio tag T. In this manner, in a case of detecting that writing of information to the radio tag T has succeeded, the processor 163 determines that the condition for writing is satisfied.

In contrast, in a case where writing information acquired from the writing information server does not match with readout information read out from the radio tag T, the processor 163 detects that the information has not been correctly written to the radio tag T. In this manner, in a case of detecting that writing of information to the radio tag T has failed, the processor 163 determines that the condition for writing is not satisfied.

Meanwhile, the processor 163 may eject the medium M that does not satisfy a condition for writing of information to the radio tag T to the first tray 210, and may eject the medium M that satisfies the condition for writing to the second tray 220.

FIG. 8A is a diagram showing an example of the shielding member provided in the first tray located in the lower stage of the medium receiving unit according to the second embodiment. FIG. 8B is a diagram showing an example of the shielding member provided in the second tray located in the upper stage of the medium receiving unit according to the second embodiment. As shown in FIG. 8A, the shielding member 211 is provided closer to the ejection unit 156 on the first tray 210. As shown in FIG. 8B, the shielding member 221 is provided closer to the ejection unit 156 on the second tray 220.

Figure 9:
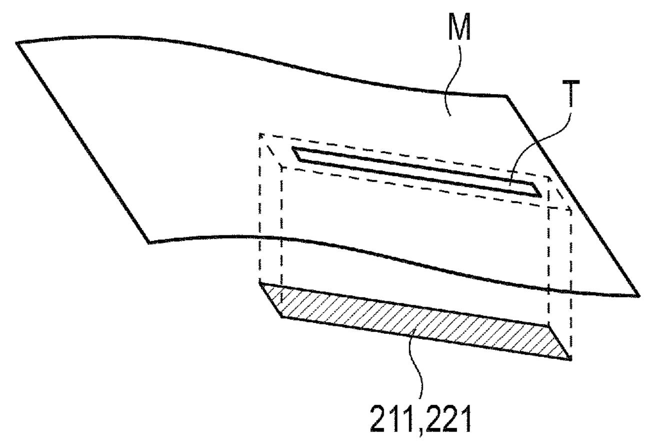
FIG. 9 is a diagram for illustrating a positional relationship between a shielding member of a tray according to the second embodiment and a radio tag of a medium on the tray.

FIG. 9 is a diagram for illustrating a positional relationship between the shielding member according to the second embodiment and the radio tag T of the medium M on the tray.

As shown in FIG. 9, the medium M ejected to the medium receiving unit 200 is loaded on the first tray 210, whereas the radio tag T of the loaded medium M faces the shielding member 211 of the first tray 210. In the radio tag T of the loaded medium M, a part including at least the IC chip CP (see FIG. 5A) is encompassed by the region perpendicularly above the shielding member 211.

Similarly, the medium M ejected to the medium receiving unit 200 is loaded on the second tray 220, whereas the radio tag T of the loaded medium M faces the shielding member 221 of the second tray 220. In the radio tag T of the loaded medium M, a part including at least the IC chip CP (see FIG. 5A) is encompassed by the region perpendicularly above the shielding member 221.

According to the second embodiment, the shielding member 211 is provided in a part of the first tray 210, and the shielding member 22 is provided in a part of the second tray 220. The shielding member 211 is adhered along, e.g., ribs of the first tray 210. Furthermore, the shielding member 221 is adhered along, e.g., ribs of the second tray 220. The medium M that satisfies a condition for writing of information to the radio tag T is loaded on the first tray 210, and the medium M that does not satisfy the condition for writing of information to the radio tag T is loaded on the second tray 220. This can provide an image forming apparatus that properly uses trays on which the media M are loaded and suppresses disadvantages of deterioration in heat radiation performance, while being superior in preventing erroneous writing.

Third Embodiment

Figure 10:
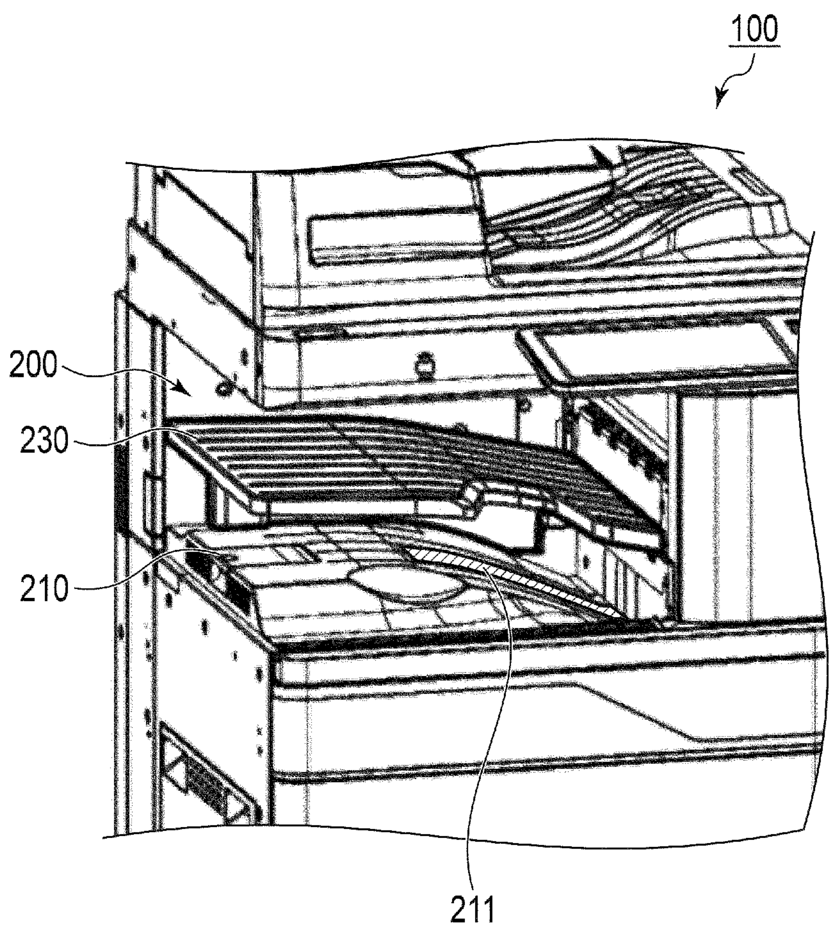
FIG. 10 is a schematic diagram showing an example of a medium receiving unit of an image forming apparatus according to a third embodiment.

FIG. 10 is a schematic diagram showing an example of a medium receiving unit of an image forming apparatus according to a third embodiment. The configuration other than the medium receiving unit 200 is as presented in FIG. 1 and FIG. 2. Furthermore, the configuration of the shielding member 211 provided in the medium receiving unit 200 is as presented in FIG. 3A to FIG. 3C and FIG. 4. Furthermore, the configuration of the medium M processed by the image forming apparatus 100 according to the third embodiment is as presented in FIG. 5A or FIG. 5B.

The medium receiving unit 200 includes a plurality of trays. For example, the medium receiving unit 200 includes the first tray 210 located in a lower stage and a second tray 230 located in an upper stage. The first tray 210 includes the shielding member 211. The second tray 230 is provided with no shielding member. The positional relationship between the shielding member 211 of the first tray 210 and the radio tag T of the medium M on the first tray 210 is as presented in FIG. 9.

In the third embodiment, the ejection unit 156 shown in FIG. 1 includes a flap. The flap switches an ejection destination of the medium M based on a signal from the processor 163. That is, the flap switches the ejection destination of the medium M to the first tray 210 or the second tray 220, and ejects the medium M to the first tray 210 or the second tray 220. For example, the processor 163 ejects the medium M that satisfies a condition for writing of information to the radio tag T to the first tray 210, and ejects the medium M that does not satisfy the condition for writing to the second tray 220.

Meanwhile, the first tray 210 may be provided with no shielding member and the second tray 230 may be provided with the shielding member. In such a case, the processor 163 ejects the medium M that satisfies a condition for writing of information to the radio tag T to the second tray 230, and ejects the medium M that does not satisfy the condition for writing to the first tray 210. The positional relationship between the shielding member 221 of the second tray 220 and the radio tag T of the medium M on the second tray 220 is as presented in FIG. 9.

Figure 11:
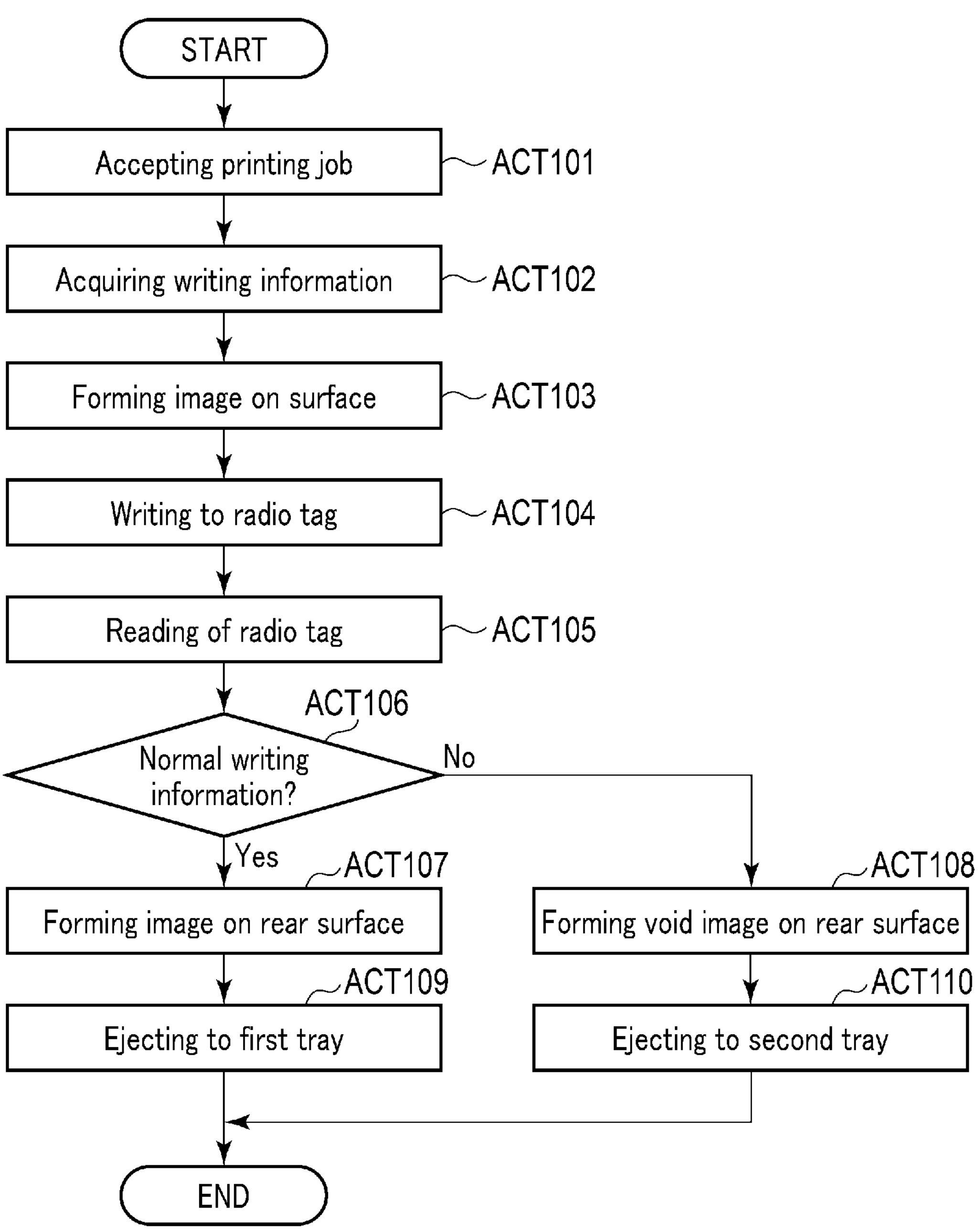
FIG. 11 is a flowchart showing an example of processing a medium by the image forming apparatus according to each of the second and third embodiments.

FIG. 11 is a flowchart showing an example of processing a medium by the image forming apparatus according to each of the second and third embodiments.

ACT 101 to ACT 108 are similar to those in the medium processing described in the first embodiment, and a description thereof is omitted.

According to the second and third embodiments, the ejection unit 156 includes a flap, and ejects the medium M to the first tray 210 or the second tray 220 by switching the ejection destination with the flap based on a signal from the processor 163. For example, the processor 163 ejects the medium M that satisfies a condition for writing of information to the radio tag T to the first tray 210, and ejects the medium M that does not satisfy the condition for writing to the second tray 220.

That is, in a case where information written to the radio tag T is normal information (ACT106, YES), the printer unit 130 forms an image on the rear surface of the medium M based on image information acquired from the writing information server (ACT107). Furthermore, the ejection unit 156 ejects the medium M to the first tray 210 of the medium receiving unit (ACT109).

In a case where information written to the radio tag T is not normal information (ACT106, NO), the printer unit 130 forms a void image on the rear surface of the medium M (ACT108). Furthermore, the ejection unit 156 ejects the medium M to the second tray 220 of the medium receiving unit 200 (ACT110).

According to the third embodiment, by providing the shielding member 211 in a part of the first tray 210 in which rewriting of information may be caused by radio waves discharged from the antenna substrate 154, and providing no shielding member in the second tray 220 far away from the antenna substrate 154, the image forming apparatus that achieves cost reduction while being superior in preventing erroneous writing can be provided. Furthermore, by loading the medium M with the radio tag T writing to which has failed on the second tray 220 provided with no shielding member, a problem caused in the event of erroneous writing can be eliminated.

The program according to the present embodiment may be transferred in a state of being stored in an electronic device such as the image forming apparatus 100, etc., or may be transferred in a state of not being stored in an electronic device. In the latter case, the program may be transferred via a network, or may be transferred in a state of being stored in a storage medium. The storage medium is a non-temporary tangible medium. The storage medium is a computer-readable medium. The storage medium may be any form of a medium that can store a program and that can be read by a computer, such as a CD-ROM and a memory card. The electronic device downloads a program transferred (provided) via a network to thereby install it in a memory, or reads a program out of a storage medium to thereby install it in a memory.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:

a processor configured to control supply and ejection of a medium which is housed in a housing unit and to which a radio tag is attached;

an image forming unit configured to form an image on the supplied medium;

a radio communication unit configured to transmit a radio wave for writing information to the radio tag of the supplied medium;

a receiving unit configured to receive the ejected medium; and a shielding member formed in a part of the receiving unit and configured to shield a radio wave transmitted from the radio communication unit, wherein the receiving unit includes a first tray and a second tray, the first tray includes the shielding member, a first distance from the radio communication unit to the first tray is shorter than a distance from the radio communication unit to the second tray, and the processor ejects the medium to the first tray provided with the shielding member in a case where the medium satisfies a condition for writing of information to the radio tag, and ejects the medium to the second tray not provided with the shielding member in a case where the medium does not satisfy the condition for writing.

2. The image forming apparatus according to claim 1, wherein a writing region which is determined according to an intensity of a radio wave transmitted from the communication unit contains the radio tag of the medium which is housed in the housing unit, and the part of the receiving unit, and the shielding member shields a radio wave which reaches the part of the receiving unit.

3. The image forming apparatus according to claim 2, wherein the shielding member is a member covering the part of the receiving unit.

4. The image forming apparatus according to claim 3, wherein the shielding member is a member continuously covering the writing region from an inside to an outside.

5. The image forming apparatus according to claim 2, wherein the radio communication unit contains an antenna substrate, and the antenna substrate is provided below a plane including the shielding member.

6. The image forming apparatus according to claim 1, wherein the receiving unit includes a receiving surface on which the medium falls onto, and the receiving surface includes an overlapping region which is overlapping with the shielding member in a vertical direction and a non-overlapping region which is not overlapping with the shielding member in a vertical direction.

7. The image forming apparatus according to claim 6, wherein the overlapping region overlaps in the vertical direction with the radio tag attached on the medium ejected onto the receiving surface and the non-overlapping region overlaps in the vertical direction with a region of the medium other than a region where the radio tag is attached.

8. The image forming apparatus according to claim 6, wherein the radio tag includes an integrated circuit chip, and the overlapping region overlaps in the vertical direction with the integrated circuit chip in the radio tag attached on the medium ejected onto the receiving surface and the non-overlapping region overlaps in the vertical direction with a region of the medium other than a region where the integrated circuit chip.

9. The image forming apparatus according to claim 6, wherein the shielding member is attached onto the receiving surface of the receiving unit.

10. The image forming apparatus according to claim 1, wherein the shielding member is closer to one side of the receiving unit where the ejected medium comes from than another side of the receiving unit which is an opposite side of the one side in a direction where the ejected medium proceeds.

11. The image forming apparatus according to claim 1, wherein the shielding member is formed longer in a direction where the ejected medium proceeds than in a direction perpendicular to the direction where the ejected medium proceeds.

12. The image forming apparatus according to claim 11, wherein the receiving unit includes a rib, and the shielding member is formed longer along the rib.

13. The image forming apparatus according to claim 1, wherein radio wave transmitted from the radio communication unit reaches the shielding member.

14. The image forming apparatus according to claim 1, wherein the radio communication unit and the shielding member are in a distance where the radio communication unit can write information to the radio tag of the ejected medium on the receiving unit if the receiving unit does not have the shielding member.

15. The image forming apparatus according to claim 1, wherein the receiving unit includes a rib, and the shielding member is attached to the receiving unit along the rib.

16. A medium ejection method applicable to an image forming apparatus including a processor configured to control supply and ejection of a medium which is housed in a housing unit and to which a radio tag is attached, an image forming unit configured to form an image on the supplied medium, a radio communication unit configured to transmit a radio wave for writing information to the radio tag of the supplied medium, a receiving unit configured to receive the ejected medium, and a shielding member formed in a part of the receiving unit and configured to shield a radio wave transmitted from the radio communication unit, the medium ejection method comprising:

ejecting the medium to the first tray provided with the shielding member in a case where the medium satisfies a condition for writing of information to the radio tag; and ejecting the medium to the second tray not provided with the shielding member in a case where the medium does not satisfy the condition for writing, wherein a first distance from the radio communication unit to the first tray is shorter than a distance from the radio communication unit to the second tray.

17. A non-transitory computer-readable storage medium storing a program for executing medium ejection applicable to an image forming apparatus including a processor configured to control supply and ejection of a medium which is housed in a housing unit and to which a radio tag is attached, an image forming unit configured to form an image on the supplied medium, a radio communication unit configured to transmit a radio wave for writing information to the radio tag of the supplied medium, a receiving unit configured to receive the ejected medium, and a shielding member formed in a part of the receiving unit and configured to shield a radio wave transmitted from the radio communication unit, the program executing:

ejecting the medium to the first tray provided with the shielding member in a case where the medium satisfies a condition for writing of information to the radio tag; and ejecting the medium to the second tray not provided with the shielding member in a case where the medium does not satisfy the condition for writing, wherein a first distance from the radio communication unit to the first tray is shorter than a distance from the radio communication unit to the second tray.

* * * * *